US012631124B1

(12) United States Patent
Heeter et al.

(10) Patent No.: US 12,631,124 B1

(45) Date of Patent: May 19, 2026

(54) FAN WITH VARIABLE DEPTH GROOVE CASING TREATMENT

(71) Applicant: Rolls-Royce North American Technologies Inc., Indianapolis, IN (US)

(72) Inventors: Robert W. Heeter, Indianapolis, IN (US); Daniel E. Molnar, Jr., Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/951,580

(22) Filed: Nov. 18, 2024

(51) Int. Cl.
*F01D 17/14* (2006.01)
*F01D 25/24* (2006.01)

(52) U.S. Cl.
CPC ........... *F01D 17/141* (2013.01); *F01D 25/24* (2013.01); *F05D 2220/36* (2013.01); *F05D 2270/20* (2013.01)

(58) Field of Classification Search
CPC ........ F01D 17/141; F01D 11/22; F04D 29/68; F02C 9/16
See application file for complete search history.

(56) References Cited

U.S. PATENT DOCUMENTS

| | | | | |
|---|---|---|---|---|
| 8,337,146 | B2 | 12/2012 | Yu | |
| 8,777,558 | B2 | 7/2014 | Brunet et al. | |
| 9,004,859 | B2 | 4/2015 | Shahpar et al. | |
| 10,066,640 | B2 | 9/2018 | Bennington et al. | |
| 10,378,550 | B2 * | 8/2019 | Lim | F04D 29/685 |
| 11,572,897 | B1 * | 2/2023 | Duong | F04D 27/0246 |
| 2003/0002982 | A1 * | 1/2003 | Irie | F04D 15/0027 415/220 |
| 2010/0310353 | A1 * | 12/2010 | Yu | F04D 29/685 415/220 |
| 2012/0315131 | A1 * | 12/2012 | Mertens | F04D 27/0215 415/126 |

* cited by examiner

*Primary Examiner* — Courtney D Heinle
*Assistant Examiner* — Cameron A Corday
(74) *Attorney, Agent, or Firm* — Barnes & Thornburg

(57) ABSTRACT

A fan case assembly includes an annular case and a fan track liner. The fan track liner includes a variable wall assembly having a stationary portion defining a circumferentially extending groove therein and a movable segment arranged in the groove. The movable segment can be selectively radially translatable within the groove. Radially inwardly facing surfaces of the movable segment and the stationary portion define a portion of a flow path across the fan track liner, and the movable segment can be radially translated within the groove to alter the portion of the flow path across the fan track liner in order to control stall margin of the engine and optimize performance of the engine.

17 Claims, 15 Drawing Sheets

FAN WITH VARIABLE DEPTH GROOVE CASING TREATMENT

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to fan track liners for gas turbine engines.

BACKGROUND

Gas turbine engines used in aircraft often include a fan assembly that is driven by a shaft to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from liberating from the fan assembly in case of a blade-off event in which a fan blade is released from the fan rotor.

Fan cases sometimes include metallic shrouds and liners positioned between the metallic shroud and the fan blades. Liners are generally used to achieve a desired dimensional tolerance between the fan blades and the fan case as well as provide a zone of frangible material for the fan blades to traverse during a fan blade-off event and subsequent fan rotor orbiting such that damage to the fan rotor is limited. The radial clearance between the fan blades and the liners may affect stall margin and overall engine efficiency. This may be the case particularly when the engine is experiencing inlet distortion due to an embedded installation.

SUMMARY

The present disclosure may comprise one or more of the following features and combinations thereof.

According to a first aspect of the present disclosure, a fan case assembly adapted for use with a gas turbine engine includes an annular case that extends circumferentially around an axis of the gas turbine engine, and a fan track liner arranged radially inwardly of and coupled to the annular case and extending circumferentially at least partway about the axis, the fan track liner including a variable wall assembly having a stationary portion defining at least one groove therein that extends circumferentially at least partway about the axis and at least one movable segment arranged in the at least one groove.

In some embodiments, the at least one movable segment has a first radial extent that is less than a second radial extent of the at least one groove so as to allow the at least one movable segment to be selectively radially translatable within the at least one groove, a first radially inwardly facing surface of the at least one movable segment and a second radially inwardly facing surface of the stationary portion define a portion of a flow path across the fan track liner, and the at least one movable segment is configured to be radially translated within the at least one groove so as to alter the portion of the flow path across the fan track liner in order to control stall margin of the gas turbine engine and optimize performance of the gas turbine engine.

In some embodiments, the at least one movable segment is configured to be selectively translated to a first position in which the first radially inwardly facing surface is located at a first radial distance from the axis, the second radially inwardly facing surface of the stationary portion is located at a second radial distance from the axis, and the at least one movable segment is configured to be selectively translated such that the first radial distance is equal to the second radial distance such that the first radially inwardly facing surface is flush with the second radially inwardly facing surface so as to provide a first stall margin.

In some embodiments, the at least one movable segment is configured to be selectively translated such that the first radial distance is greater than the second radial distance such that the first radially inwardly facing surface is located radially outward of the second radially inwardly facing surface so as to provide a second stall margin different than the first stall margin.

In some embodiments, the stationary portion is comprised of a plurality of stationary segments, a first stationary segment and a second stationary segment of the plurality of stationary segments are axially spaced apart from each other so as to define a first groove of the at least one groove therebetween.

In some embodiments, the plurality of stationary segments includes a third stationary segment that is arranged axially adjacent to and contacting the second stationary segment, a first axial distance between a forward facing surface of the second stationary segment that faces the first groove and an aft facing surface of the third stationary segment is greater than a second axial distance between an aft facing surface of the first stationary segment that faces the first groove and the forward facing surface of the second stationary segment In some embodiments, the at least one movable segment includes a first movable segment and a second movable segment, the first movable segment and the second movable segment are arranged within the first groove, and the first movable segment and the second movable segment are each independently translatable within the first groove.

In some embodiments, the variable wall assembly further includes a central wall that extends axially through the at least one groove so as to divide the at least one groove into a first groove and a second groove such that the first groove is circumferentially spaced apart from the second groove by the central wall, the first groove and the second groove each include a bottom surface of the respective groove, and the central wall has a third radially inwardly facing surface that is closer to the axis than the bottom surface of the first and second grooves such that the first groove is separate from the second groove.

In some embodiments, the at least one movable segment includes a first movable segment arranged in the first groove and a second movable segment arranged in the second groove.

In some embodiments, a first circumferential extent of the first groove is equal to a second circumferential extent of the second groove.

In some embodiments, a first circumferential extent of the first groove is different than a second circumferential extent of the second groove.

In some embodiments, the fan track liner includes a plurality of liner segments that are arranged around the annular case and that each include a respective variable wall assembly.

In some embodiments, the at least one groove includes a first groove and a second groove defined by the stationary portion, and the first groove is axially spaced apart from the second groove.

In some embodiments, the at least one movable segment includes a first movable segment arranged in the first groove and a second movable segment arranged in the second groove, and the first movable segment and the second movable segment are each independently translatable such that the first and second movable segments are configured to be arranged at the same or different radially positions within the first and second grooves, respectively.

According to a further aspect of the present disclosure, a fan case assembly adapted for use with a gas turbine engine includes an annular case that extends circumferentially around an axis of the gas turbine engine, and a fan track liner coupled to the annular case and including a variable wall assembly having a stationary portion defining at least one groove therein and at least one movable segment arranged in the at least one groove. In some embodiments, the at least one movable segment is selectively radially translatable within the at least one groove, and radial translation of the at least one movable segment within the at least one groove is configured to alter a flow path across the fan track liner in order to control stall margin of the gas turbine engine and optimize performance of the gas turbine engine.

In some embodiments, the stationary portion is comprised of a plurality of stationary segments, and a first stationary segment and a second stationary segment of the plurality of stationary segments are axially spaced apart from each other so as to define a first groove of the at least one groove therebetween.

In some embodiments, the at least one movable segment includes a first movable segment and a second movable segment, the first movable segment and the second movable segment are arranged within the first groove, and the first movable segment and the second movable segment are each independently translatable within the first groove.

In some embodiments, the variable wall assembly further includes a central wall that extends axially through the at least one groove so as to divide the at least one groove into a first groove and a second groove such that the first groove is circumferentially spaced apart from the second groove by the central wall, and the first groove and the second groove each include a bottom surface of the respective groove, wherein the central wall has a third radially inwardly facing surface that is closer to the axis than the bottom surface of the first and second grooves such that the first groove is separate from the second groove, and the at least one movable segment includes a first movable segment arranged in the first groove and a second movable segment arranged in the second groove.

In some embodiments, the at least one groove includes a first groove and a second groove defined by the stationary portion, the first groove is axially spaced apart from the second groove, the at least one movable segment includes a first movable segment arranged in the first groove and a second movable segment arranged in the second groove, and the first movable segment and the second movable segment are each independently translatable such that the first and second movable segments are configured to be arranged at the same or different radially positions within the first and second grooves, respectively.

In some embodiments, the fan case assembly further includes at least one actuator configured to translate the at least one movable segment radially.

According to a further aspect of the present disclosure, a method includes providing an annular case that extends circumferentially around an axis of a gas turbine engine, arranging a fan track liner radially inwardly of the annular case and extending circumferentially at least partway about the axis and coupling the fan track liner to the annular case, the fan track liner including a variable wall assembly having a stationary portion defining at least one groove therein that extends circumferentially at least partway about the axis and at least one movable segment arranged in the at least one groove, wherein the at least one movable segment has a first radial extent that is less than a second radial extent of the at least one groove so as to allow the at least one movable segment to be selectively radially translatable within the at least one groove, wherein a first radially inwardly facing surface of the at least one movable segment and a second radially inwardly facing surface of the stationary portion define a portion of a flow path across the fan track liner, and radially translating the at least one movable segment within the at least one groove so as to alter the portion of the flow path across the fan track liner in order to control stall margin of the gas turbine engine and optimize performance of the gas turbine engine.

These and other features of the present disclosure will become more apparent from the following description of the illustrative embodiments.

DETAILED DESCRIPTION OF THE DRAWINGS

Figure 1:
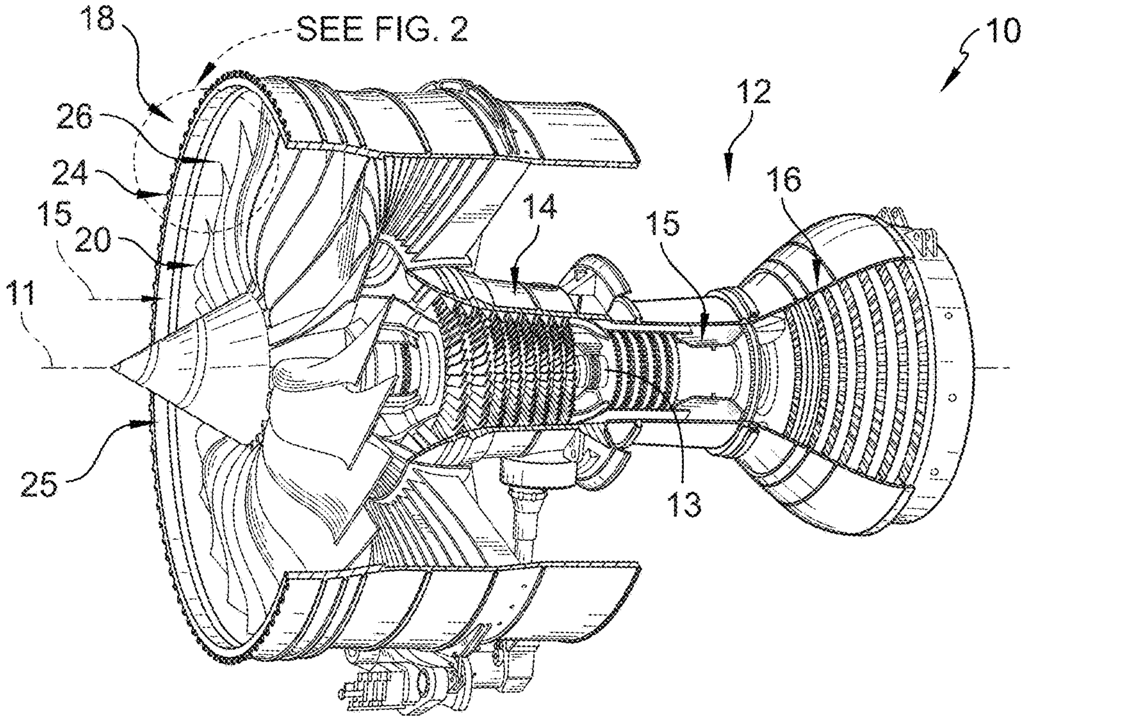
FIG. 1 is a cutaway view of a gas turbine engine that includes a fan, a compressor, a combustor, and a turbine, the fan including a fan rotor with fan blades configured to rotate about an axis of the engine and a fan case assembly that surrounds the fan blades and showing that the fan case assembly includes an annular case and a fan track liner coupled to the annular case.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown in FIG. 1 and includes an engine core 12 and a fan 18 arranged upstream of the engine core 12. The engine core 12 is configured to compress and combust air entering the gas turbine engine 10 to drive rotation of one or more shafts 13 about a rotation axis 11 of the gas turbine engine 10. The one or more shafts 13 interconnect the engine core 12 and the fan 18 to cause rotation of the fan 18 and to provide thrust for the gas turbine engine 10.

The engine core 12 includes a compressor 14, a combustor 15, and a turbine 16. The compressor 14 includes one or more stages of rotating blades that compress air entering the engine core 12 and produce pressurized air which is transferred downstream to the combustor 15. The combustor is configured to mix fuel with the pressurized air and combust the fuel and pressurized air to produce combustion products which are transferred downstream to the turbine 16. The turbine 16 also includes one or more stages of rotating blades which are coupled to the one or more shafts 13 and are driven in rotation about the axis 11. Rotation of the one or more shafts 13 causes rotating components of the fan 18 to rotate about the axis 11.

The fan 18 includes a fan case assembly 24 extending circumferentially about the axis 11 and a plurality of rotating blades 20 spaced radially inward of the fan case assembly 24, as shown in FIG. 1. The fan case assembly 24 provides an outer boundary of a flow path 15 into the gas turbine engine 10 and lines the plurality of rotating blades 20. The plurality of rotating blades 20 extend from a hub that is coupled to at least one of the one or more shafts 13 for rotation therewith about the axis 11.

Figure 2:
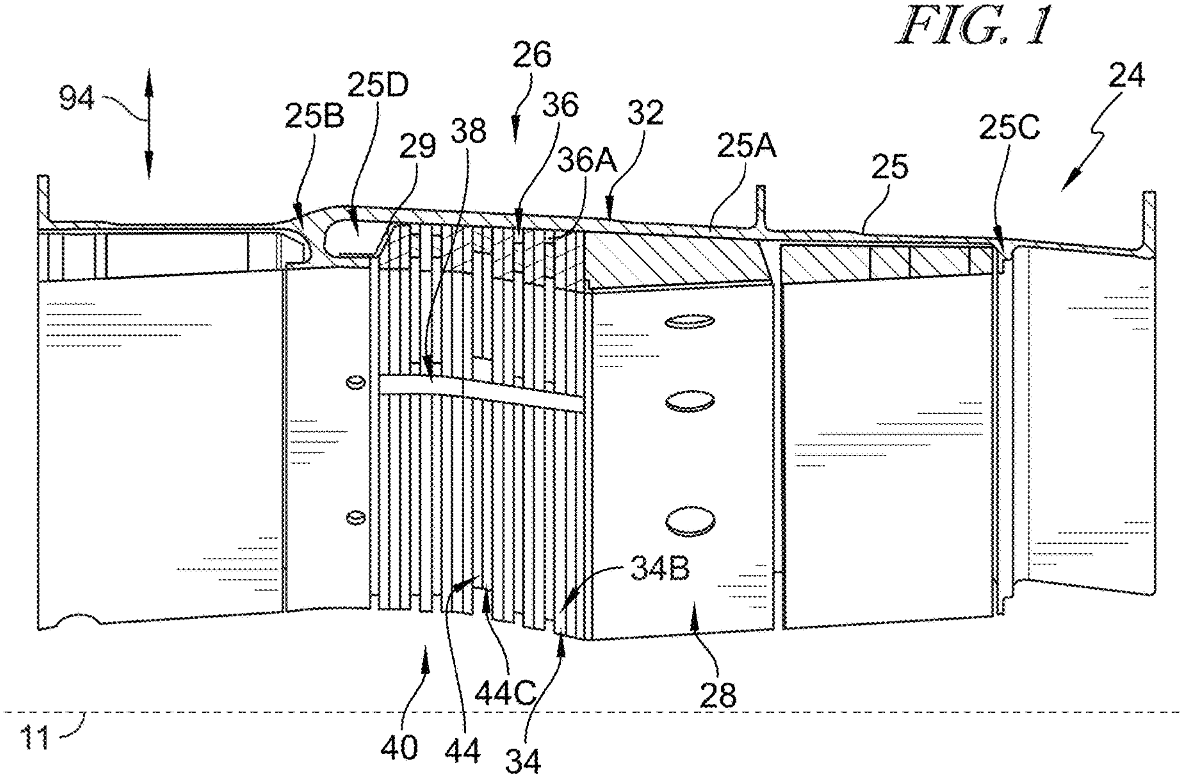
FIG. 2 is side cross-sectional view of the fan case assembly of FIG. 1, showing that the assembly includes a fan track liner including a variable wall assembly having a stationary portion defining a plurality of grooves therein that each extend circumferentially at least partway about the central axis and a movable segment arranged in each of the grooves, and showing that each of the movable segments is radially translatable to the same or different radial positions so as to alter the gas path across the fan track liner and thus control stall margin and optimize engine performance.

The fan case assembly 24 is fixed relative to the plurality of blades 20 and illustratively includes an annular case 25 and a fan track liner 26 supported by the annular case 25, as shown in FIG. 2. The annular case 25 extends circumferentially about the axis 11 of the gas turbine engine 10, and can be formed as a full annular hoop or in segmented sections. The fan track liner 26 also extends circumferentially around the axis 11 and may form a full hoop or a plurality of circumferentially spaced sections that line the radial tips of the plurality of blades 20. The fan track liner 26 is located radially inward of at least a portion of the annular case 25 and is located directly outward of the radial tips of the plurality of blades 20. The distance between the plurality of blades 20 and the fan track liner 26 may affect stall margin and overall engine efficiency, which may be particularly apparent when the engine 10 is experiencing distorted inlet flow associated with an embedded engine inlet.

Illustratively, the annular case 25 can include an annular base portion 25A that extends circumferentially about the axis 11 and a forward hook 25B that defines a portion of the flow path 15 and an aft inner rib 25C. The annular case 25 can be formed to include a pocket 25D between the forward hook 25B and aft inner rib 25C that opens and faces toward axis 11. The fan track liner 26 is arranged to lie within the pocket 25D and can be retained in the pocket 25D by a bolting arrangement (not shown). A person skilled in the art will understand that any other arrangement or means of coupling the components of the fan track liner 26 to the annular case 25 may be utilized.

It is noted that, while the fan track liner 26 is referred to in the following description and related figures as a segmented section of a full annular hoop, the present disclosure contemplates all possible arrangements of the fan track liner 26 as arranged within the annular case 25, including but not limited to, half hoop configurations arranged adjacent to each other, as well as full hoop arrangements.

Figure 4:
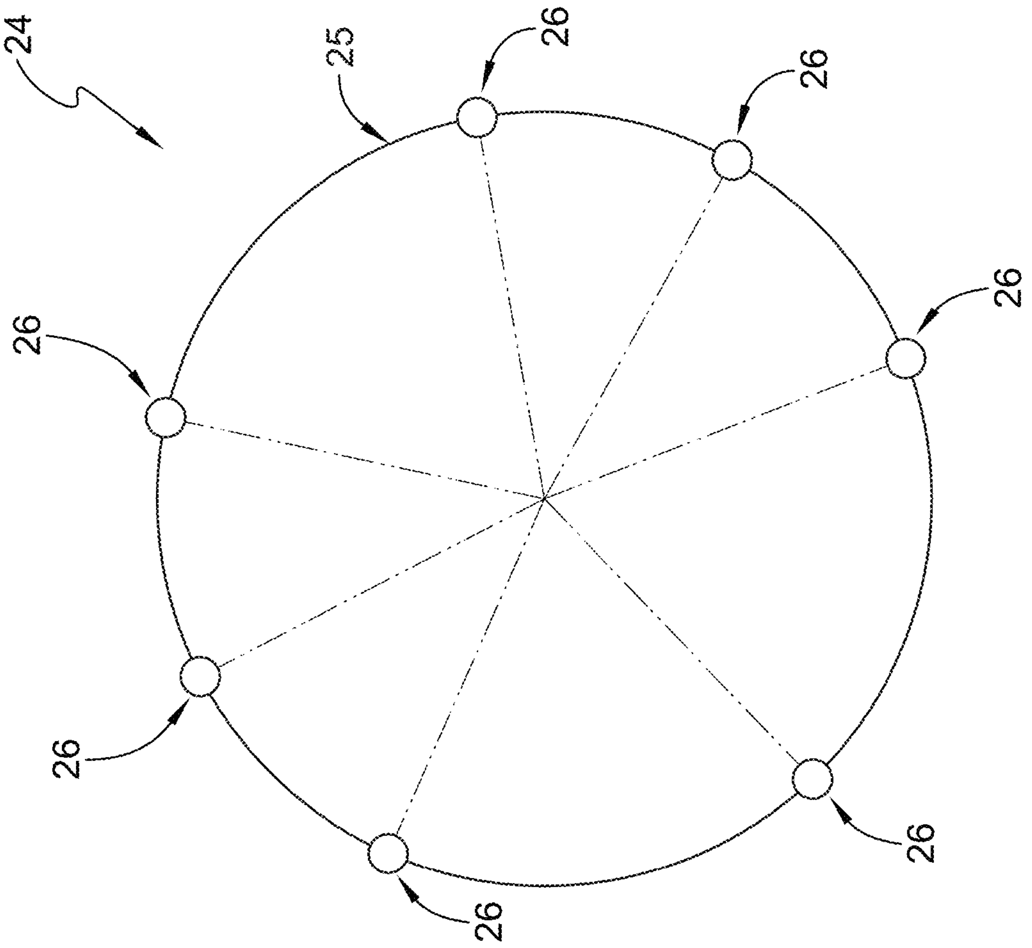
FIG. 4 is a conceptual view of the fan track liner of FIG. 2, showing that the fan track liner can be formed as a segment of an annular ring of a plurality of fan track liners, and that each individual segment of fan track liner can be arranged at differing circumferential distances from at least some of the other segments of fan track liner.
Figure 7:
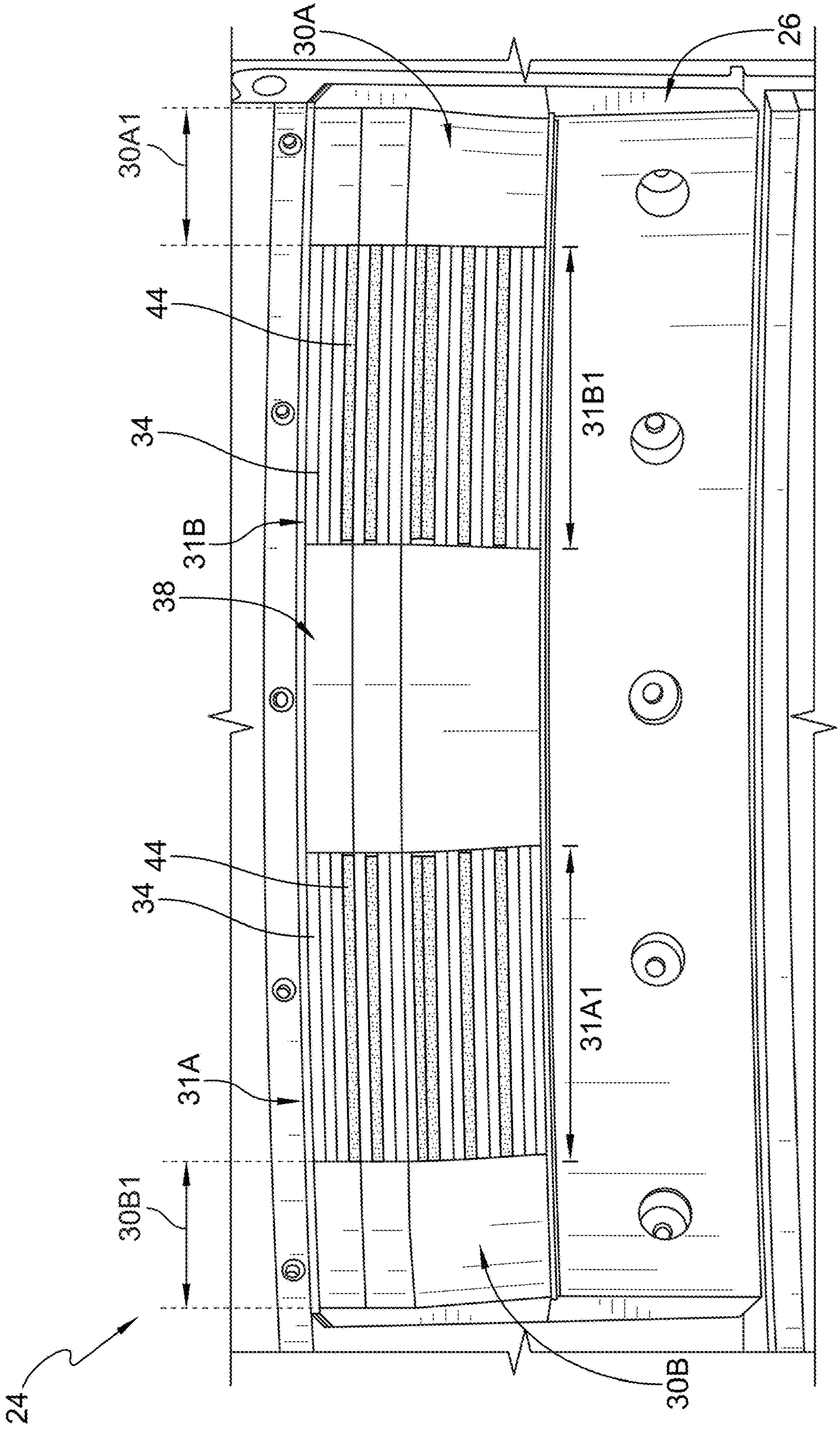
FIG. 7 is a bottom view of an alternative arrangement of the fan track liner of FIG. 3A, showing that the first and second plurality of grooves on the either side of the central wall have a smaller circumferential extent than those illustrated in FIG. 3A.

It is also noted that the segments of fan track liner 26 can be arranged in a non-repeating pattern around the circumference of the fan case assembly 24 (i.e. about the annular case 25), as shown in FIG. 4. For example, some segments of fan track liner 26 can be circumferentially spaced apart further from each other as compared to other segments. This can aid in breaking up aeromechanical responses such as with forcing and flutter, as repeating patterns can cause excitations and vibrations within the fan 18. Moreover, each segment of fan track liner 26 can be formed to have the same or differing circumferential extents. Accordingly, various circumferential spacings of the same or different sized segments of fan track liner 26 can be used around the fan case assembly 24. In one non-limiting example, as shown in FIG. 4, there may be seven segments of fan track liner 26 arranged about the circumference of the fan case assembly 24 spaced apart as illustrated in the figure (i.e. approximately 51 degrees of the total circumference occupied by each segment). In such an embodiment, approximately half of the segment may include treatment (grooves 36 and movable segments 44, as shown in FIG. 7 as an example).

A person skilled in the art will understand that other numbers of liners 26 can be used, such as, for example, five bonded composite liners 26, seven bolted composite liners 26, or nine bolted composite liners 26. In other examples, a semi-sinusoidal pattern with varying sizes of segments in the fan track liner 26 can be used, thus creating a semi-sinusoidal pattern of treatment about the fan track liner 26. The control system 90 described herein that controls the movable segments 44 of the fan track liners 26 may control each fan track liner 26 independent of the other fan track liners 26 so that different arrangements of the movable segments 44 of each fan track liner 26 can be used depending on the needs of each circumferential location of the fan case assembly 24.

The fan track liner 26 includes an aft flowpath liner wall 28 and a variable wall assembly 32 arranged within the pocket 25D, as shown in FIGS. 2-9C. As shown in FIG. 2, the aft flowpath liner wall 28 arranged aft of the variable wall assembly 32 and coupled to the annular case 25. The variable wall assembly 32 is arranged between the aft flowpath liner wall 28 and a retaining wall 29 that extends from the forward hook 25B.

The variable wall assembly 32 includes a stationary portion 34 and a plurality of grooves 36 formed within the stationary portion 34, as shown in FIGS. 2-9C. Illustratively, the stationary portion 34 is formed by a plurality of individual stationary segments 34A, as shown in FIG. 3A. Each segment 34A can be formed as a thin, circumferentially extending plate, and the segments 34A can be arranged axially adjacent to each other so as to form the stationary portion 34. As will be described in greater detail below, axial spacing of two segments 34A from each other creates a groove 36 therebetween. Some segments 34A can be positioned directly adjacent to and in contact with each other to create stacks of segments 34A, as shown in FIG. 3A. In some embodiments, the stationary segments 34A may be assembled into the liner 26 after the liner 26 is installed within the annular case 25. In some embodiments, the stationary portion 34, which may include the stationary segments 34A or the integrally formed segments 34A' described below, can be installed first, and then the movable segments 44 are installed afterwards.

Figure 8A:
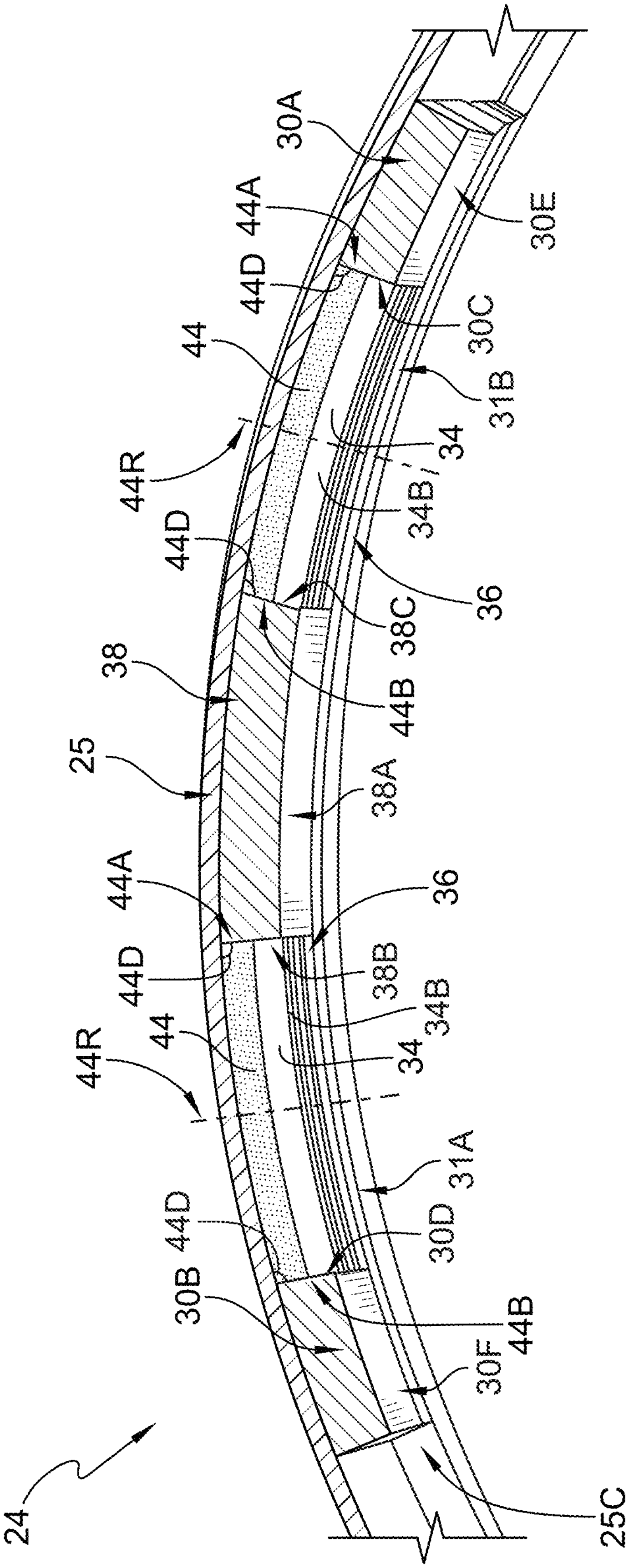
FIG. 8A is an axially facing cross-sectional view of the fan track liner of FIG. 2, showing that the first and second plurality of grooves on the either side of the central wall have equal circumferential extents and that the side walls of the grooves and the circumferential ends of the movable segments are parallel to a central radially extending line of the groove and segment in order to accommodate radially translation of the movable segments therein without creating a gap between the segments and the side walls of the grooves.

As shown in FIGS. 2-9C, and more clearly in FIG. 8A, the variable wall assembly 32 further includes a central wall 38 that extends axially and is located generally centrally between a first circumferential side wall 30A of the fan track liner 26 and a second, opposite circumferential side wall 30B of the fan track liner 26. As can be seen in FIG. 8A, the central wall 38 and the first and second circumferential side walls 30A, 30B of the fan track liner 26 each extend radially inwardly generally the same distance so as to create first and second pockets 31A, 31B on opposing sides of the central wall 38 within which the segments 34A of the stationary portion 34 may be arranged. In some embodiments, radially inwardly facing surfaces 30E, 30F of the circumferential side walls 30A, 30B may be equidistant from the axis 11 as a radially inwardly facing surface 38A of the central wall 38.

As will be described below, the central wall 38 essentially divides the grooves 36 formed between axially spaced apart segments 34A in half, thus making it easier for the movable segments 44 to be radially translated within the grooves 36. In some embodiments, this may be referred to as dividing a single groove 36 formed between a pair of segments 34A into a first groove 36 on one side of the central wall 38 and a second groove 36 on the opposing side of the central wall 38. It is noted that, although a central wall 38 is included in the illustrative embodiments described herein, a person skilled in the art will understand that grooves 36 and movable segments 44 that extend the entire distance from the first circumferential side wall 30A to the second circumferential side wall 30B, and possibly even further in either direction, are contemplated by the present disclosure.

Figure 3A:
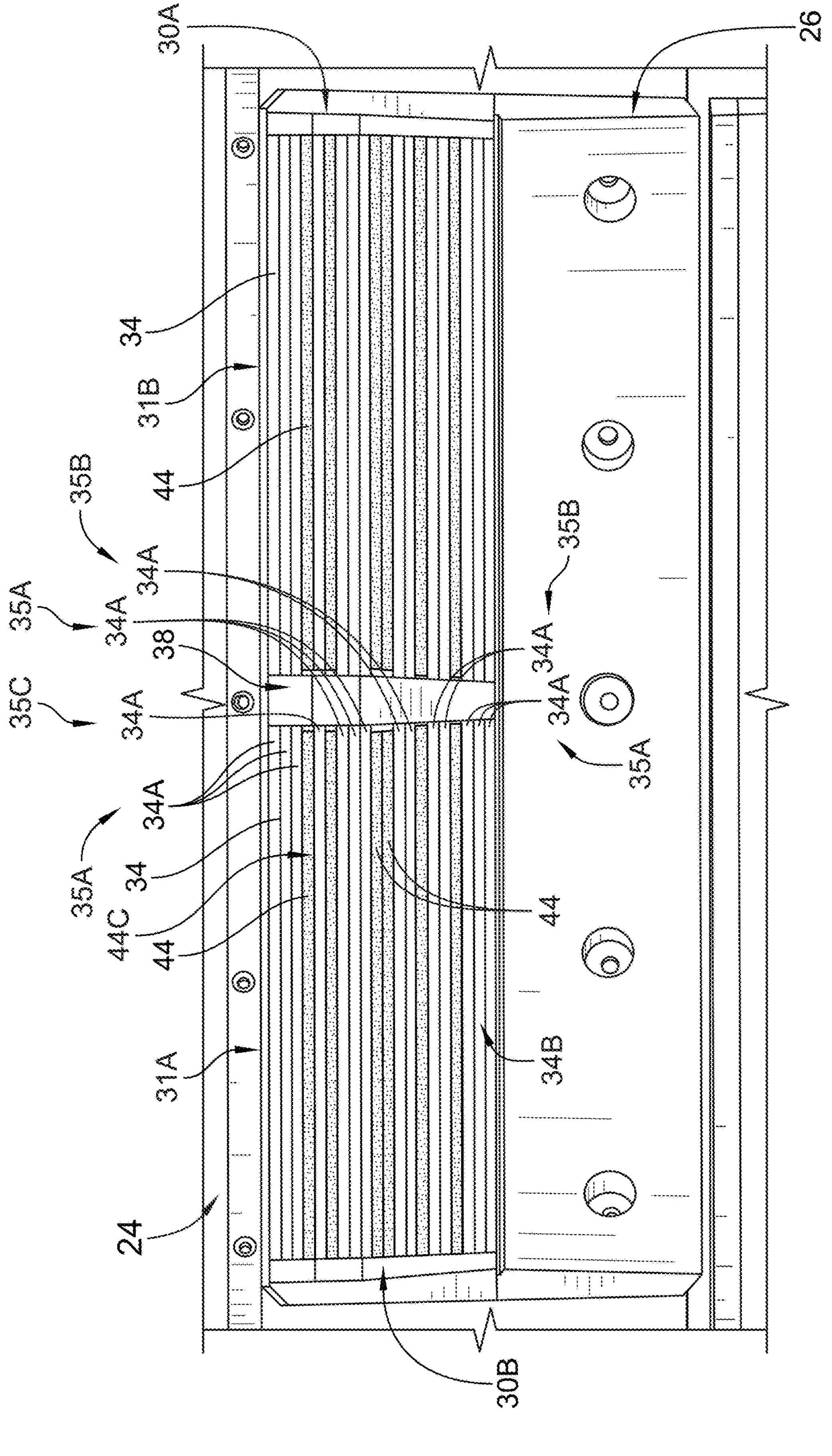
FIG. 3A is a bottom view of the fan track liner of FIG. 2, showing that the fan track liner can be formed as a segment of an annular ring of a plurality of fan track liners, and showing that the grooves are dividing by a central wall extending axially through the grooves so as to create a first plurality of grooves on one side of the central wall and a second plurality of grooves on the other side of the central wall, and showing that the stationary portion can be formed of a plurality of stationary segments arranged axially adjacent to each other.

As shown in FIG. 3A, the segments 34A are arranged within the pockets 31A, 31B. The segments 34A arranged in the first pocket 31A each extend from the first circumferential side wall 30A to the central wall 38, and the segments 34A arranged in the second pocket 31B extend from the second circumferential side wall 30B to the central wall 38. The segments 34A may be arranged axially in succession (see FIG. 9A, which illustrates that each segment 34A includes an axially forward facing surface 34C and an opposite axially aft facing surface 34D, and the axially forward facing surfaces 34C face the axially aft facing surfaces 34D of adjacent segments 34A).

Illustratively, pairs of segments 34A can be axially spaced apart from each other so as to define a groove 36 therebetween. As can be seen more clearly in FIG. 8A, the grooves 36 each extend circumferentially along the circumferential extent of the segments 34A within each pocket 31A, 31B, and each include a radial depth that extends from an inner surface of the annular case 25 to radially inwardly facing surfaces 34B of the segments 34A that define the groove 36.

As can be seen in FIGS. 2 and 3A, the variable wall assembly 32 can include a plurality of grooves 36 axially spaced apart from each other along an axial length of the wall assembly 32. In some areas of the wall assembly 32, some segments 34A can be grouped together in groups of two, three, or more axially stacked segments 34A so as to vary the axial distance between grooves 36. For example, as shown in FIG. 2 and further detailed in FIGS. 3A, the segments 34A that make up the stationary portion 34 can include single segments 34A between grooves 36 (referenced by 35C in FIG. 3A), groups of two segments 34A between grooves 36 (referenced by 35B in FIG. 3A), and groups of three segments 34A between grooves 36 (referenced by 35A in FIG. 3A). Also, in some embodiments, some segments 34A can be further axial spaced apart than others so as to define axially wider grooves 36, as shown by the central groove 36 in FIGS. 2-3B.

A person skilled in the art will understand that any number of segments 34A can be grouped together to form groups of segments 34A along the axial length of the wall assembly 32, as such, for example, four, five, six, seven, eight, nine, ten, or more segments 34A. Thus, the axial distance between the plurality of grooves 36 can be adjusted by including more or less segments 34A between the grooves 36 based on the design requirements of engine 10.

A person skilled in the art will also understand that, as opposed to including individual stationary segments 34A arranged axially adjacent to each other, each group of segments 34A can be integrally formed, monolithic segments 34A', as shown in FIG. 3B and FIGS. 9A-9D. Specifically, the stationary portion 34' can include multiple integrally formed, monolithic segments 34A' having varying axial widths. The grooves 36' are formed between opposing axial faces of the integrally formed, monolithic segments 34A'.

Forming the stationary portion 34 as integrally formed segments 34A' may be beneficial in some scenarios in which the exact size, axially, circumferentially, and/or radially, of a group of segments 34A is known, and thus forming multiple segments 34A as a single, integrally formed, monolithic segment 34A' may ease in producing the segment 34A'. In other words, division of such a segment 34A' into multiple individual segments 34A may not provide a benefit in some scenarios. For example, in some scenarios such as when the fan case assembly 24 is being utilized on a developmental test rig and having the ability to modify small axial locations of the stationary portion 34, it may be more beneficial to use the individual segments 34A described. In some scenarios such as when the fan case assembly 24 is being utilized in production on to-be assembled engines, it may be more beneficial to use the integrally formed segments 34A'.

Turning again to the grooves 36, each of the grooves 36 can be defined as follows. Forward and aft sides of each groove 36 are defined by opposing axially facing surfaces 34C, 34D of a pair of segments 34A, opposing circumferential sides of the groove 36 are defined by one of the first and second circumferential side walls 30A, 30B and the central wall 38. A bottom surface 36A of each groove 36 (see FIGS. 9A-9D for more detail) can be defined by an inner surface of the annular case 25. A person skilled in the art will understand that the grooves 36 can be further delimited by additional components inserted between the segments 34A, such as, for example, an additional elongated segment arranged in the groove 36 and contacting the annular case 25 so as to reduce the radial extent of the groove 36.

Figure 3B:
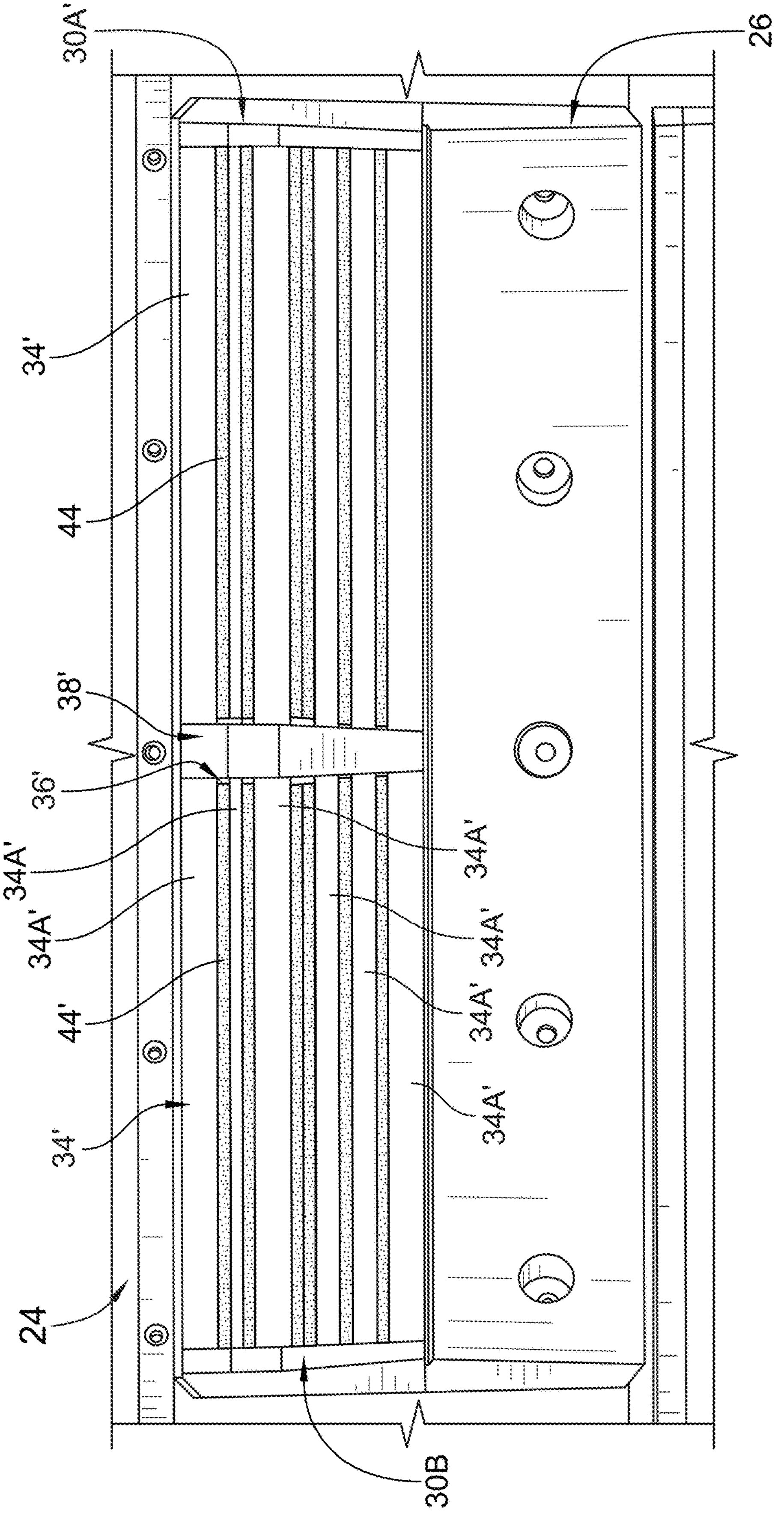
FIG. 3B is a bottom view of an alternative arrangement of the fan track liner of FIG. 3A, showing that the plurality of stationary segments can be formed as integrally formed sections, the grooves being defined axially between these integrally formed sections.

FIGS. 3A and 3B show examples of the first and second pockets 31A and 31B having the same circumferential extents, and that the central wall 38 is arranged centrally along the segment of fan track liner 26. As a result, the segments 34A arranged in the first pocket 31A have the same circumferential extent as the segments 34A arranged in the second pocket 31B, and thus all grooves 36 also have the same circumferential extents. In some applications, such as when different distortion effects are produced in certain areas of around the fan case assembly 24, it may be beneficial to have differently sized pockets 31A, 31B, and thus differently sized segments 34A and grooves 36. Non-limiting examples of possible variations in the circumferential extents of the first and second pockets 31A, 31B are shown in FIGS. 5-7.

Figure 5:
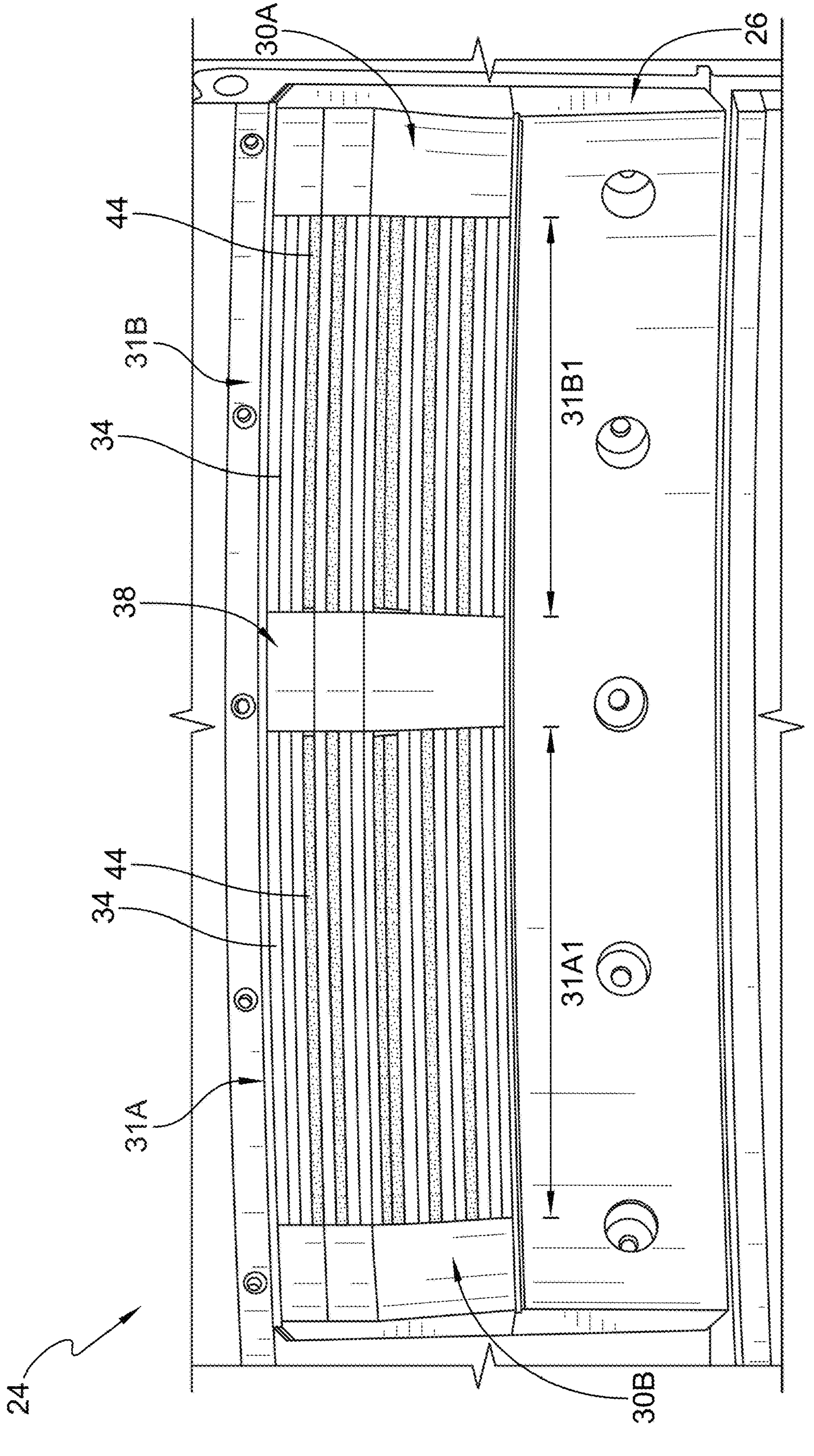
FIG. 5 is a bottom view of an alternative arrangement of the fan track liner of FIG. 3A, showing that the second plurality of grooves on the other side of the central wall have a smaller circumferential extent than the first plurality of grooves on the one side of the central wall, and showing that some grooves can include two or three movable segments therein.

FIG. 5 shows that the central wall 38 can be offset toward the first circumferential side wall 30A. As a result, the circumferential extent 31B1 of the second pocket 31B is smaller than the circumferential extent 31A1 of the first pocket 31A, and thus the segments 34A and grooves 36 formed in the second pocket 31B will be smaller than those of the first pocket 31A.

Figure 6:
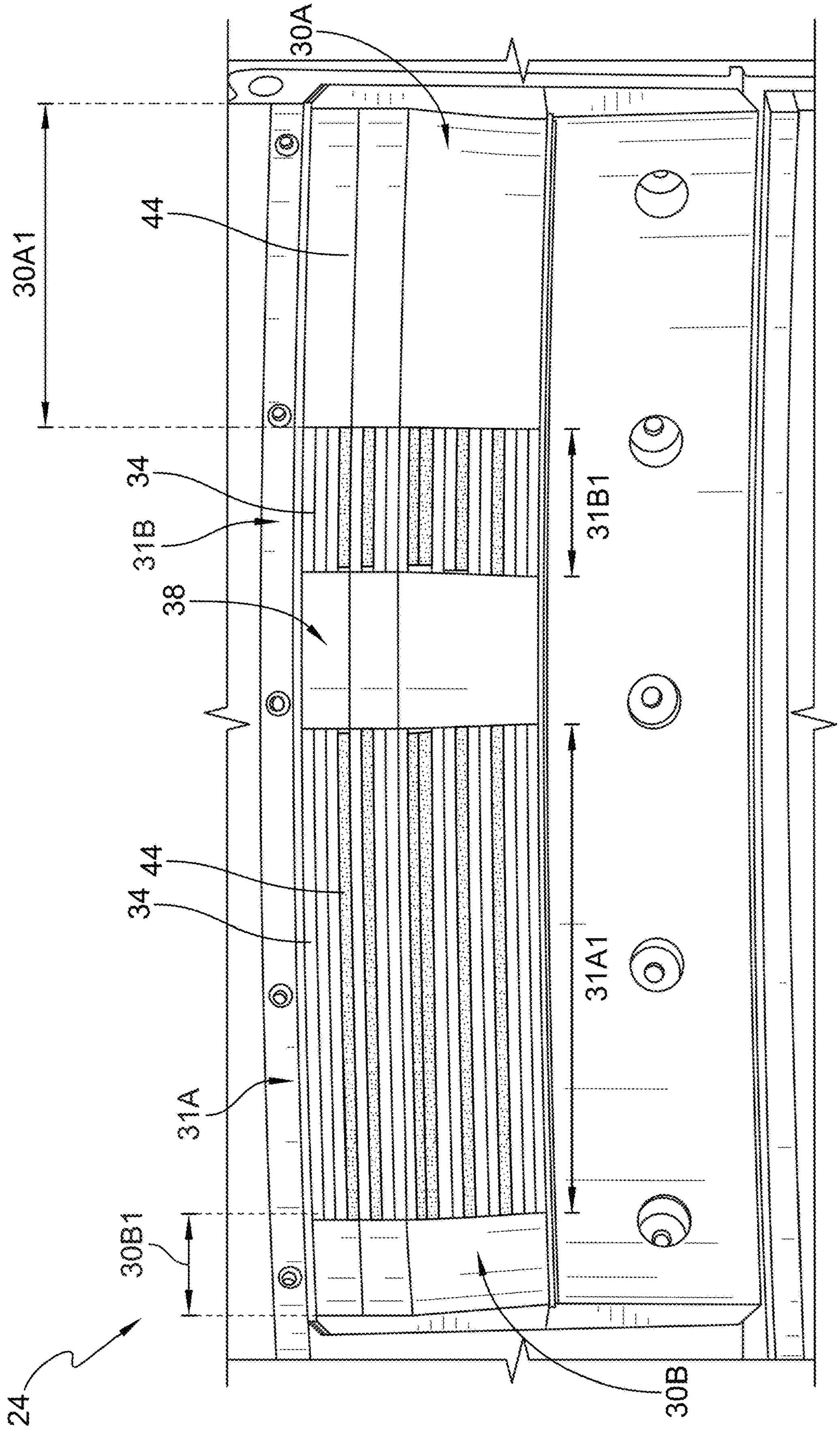
FIG. 6 is a bottom view of an alternative arrangement of the fan track liner of FIG. 5, showing that the second plurality of grooves on the other side of the central wall have an even smaller circumferential extent than those illustrated in FIG. 5.

FIG. 6 shows that the central wall 38 can be offset toward the first circumferential side wall 30A and that the first circumferential side wall 30A can be circumferential wider than the second circumferential side wall 30B. Specifically, the first circumferential side wall 30A can have a first circumferential extent 30A1 that is greater than a circumferential extent 30B1 of the second circumferential side wall 30B. As a result, the circumferential extent 31B1 of the second pocket 31B is much smaller than the circumferential extent 31A1 of the first pocket 31A, and thus the segments 34A and grooves 36 formed in the second pocket 31B will be much smaller than those of the first pocket 31A.

FIG. 7 shows that the central wall 38 is centered similar to FIG. 3A, but the circumferential side walls 30A, 30B are circumferentially wider than those illustrated in FIG. 3A. As a result, the circumferential extents 31A1, 31B1 of the first and second pockets 31A, 31B in FIG. 7 are smaller than those illustrated in FIG. 3A, and thus the segments 34A and grooves 36 formed in these pockets 31A, 31B are smaller than those illustrated in FIG. 3A. In some embodiments, approximately half of the circumferential extent of the liner 26 includes treatment (the grooves 36 and movable segments 44). As a result, in some embodiments, such as when seven segments of liners 26 are used such as shown in FIG. 4 and in which each segment of liner 26 occupies approximately 51 degrees of the circumference of the assembly 24, and there is some portion remaining stationary at the edges (30A, 30B), the treatment area of each segment of liner 26 may occupy approximately 25.5 degrees of the circumference of the assembly 24.

A person skilled in the art will understand that the circumferential extents of the pockets 31A, 31B and thus the segments 34A and grooves 36 therein may vary based on the design needs of the fan case assembly 24, in particular with regard to the specific forces and distortions experienced at different circumferential locations around the annular case 25. In some embodiments, it may be desired that the pockets 31A, 31B occupy approximately 75 percent of the circumferential extent of the segmented fan track liner 26, although 50 percent or less can also produce optimal results.

As a non-limiting example, the pockets 31A, 31B can occupy a range of 25 percent to 95 percent of the circumferential extent of the segmented fan track liner 26, and in some embodiments, occupy a range of 35 percent to 85 percent of the circumferential extent of the segmented fan track liner 26, and in some embodiments, occupy a range of 45 percent to 75 percent of the circumferential extent of the segmented fan track liner 26, and in some embodiments, occupy a range of 55 percent to 65 percent of the circumferential extent of the segmented fan track liner 26.

It is noted that stall develops over a period of time and over a circumferential arc, so long spans of untreated flow path 15 would be avoided but the duration would not necessarily have to be consistent nor would the treatment length. This provides the opportunity to avoid a forcing function caused by the liners 26 and their grooves 36 being a repeating pattern, as noted above with regard to FIG. 4.

In some non-limiting examples, it may be beneficial to provide as little treatment as possible in order to optimize efficiency, and locating grooves 36 and segments 44 in certain circumferential position may be advantageous since the intake tends to generate stronger distortions in certain locations because of the shape of the intake or the shape of the transition duct. Certain fan speed ranges may also be targeted in some embodiments because that can be where the largest shortfalls are and the intake generates similar flow patterns at a corresponding aircraft speed. Wider grooves 36 at a certain locations may be better at certain fan speeds and narrow ones better at others. Radial translation of adjacent treatment segments can vary treatment width.

Moreover, variations in treatment duration about the circumference as well as treatment circumferential location may help minimize forcing on the rotor by the liner 26 treatment. Additionally, this may be important to fit treatment 26 on removable liners 26 while still being at a non-repeating pattern (depending on where treatment is located relative to the liner 26 splits). Additionally, having interruption in the liner 26 treatment (i.e. interruption in between the grooves 36) is important for potentially having instrumentation in the liner 26 area, which may help this be a distortion in an active system, which enables active control of treatment. In some embodiments in which there is increased distortion at a bottom side of the inlet, there could be arranged a higher number of treatment areas (i.e. movable segments 44) and then only have a minimum treatment around the rest of the circumference.

Arranged within each groove 36 is at least one movable segment 44, as shown in FIGS. 2-10C. Each movable segment 44 has a radial extent 44R that is less than the radial extent 36R of the groove 36 within which it is arranged such that each movable segment 44 is radially translatable within the groove 36 (see FIG. 9A). FIG. 8A shows each movable segment 44 in a fully raised position (i.e. furthest radially outwardly within the groove 36), and FIGS. 2 and 9A-9D show examples of various positions of movable segments 44 within different grooves 36. Different arrangements of the movable segments 44 within the grooves 36 can having different effects on the flow through the fan case assembly 24, as will be described in detail below.

In some embodiments, the radial extents 36R of the grooves 36 defined by the segments 34A may be in a range of 0.25 inches to 1.5 inches, as the typical depth of the fan track liner 26 is approximately 1 inch. In such embodiments, the radial extents 44R of the respective movable segments 44 arranged in the grooves 36 may be in a range of 0.1× to 0.9× the radial extent 36R of the groove and any value therebetween. The smaller the radial extent 44R of the respective movable segment 44 are relative to the radial extent 36R of the groove 36 allows for greater range of translation of the segment 44 within the groove 36. In some embodiments, the radial extents 36R of the grooves 36 may be in a range of 0.5 inches to 1.25 inches. In some embodiments, the radial extents 36R of the grooves 36 may be in a range of 0.75 inches to 1 inch.

As can be seen in FIG. 8A, each movable segment 44 includes a first end 44A and a second end 44B opposite the first end 44A. Illustratively, the first and second ends 44A, 44B, as well as the inner walls 30C, 30D of the circumferential side walls 30A, 30B and inner walls 38B, 38C of the central wall 38, are formed to be parallel with a centrally-located radial line 44R of the segment 44, which is also a centrally-located radial line of the groove 36. This centrally-located radial line 44R of the segment 44 extends in the radial direction (i.e. at a 90 degree angle from the outer surface of the segment 44 to a center of the circle defined by the case 25). Because the first and second ends 44A, 44B of the segment 44 are circumferentially spaced apart from the radial line 44R but are parallel with the radial line 44R, the angle 44D formed between the first and second ends 44A, 44B and the inner walls 30C, 30D of the circumferential side walls 30A, 30B and inner walls 38B, 38C of the central wall 38 will be slightly greater than 90 degrees. This allows the segment 44 to translate radially within the groove 36.

Figure 8B:
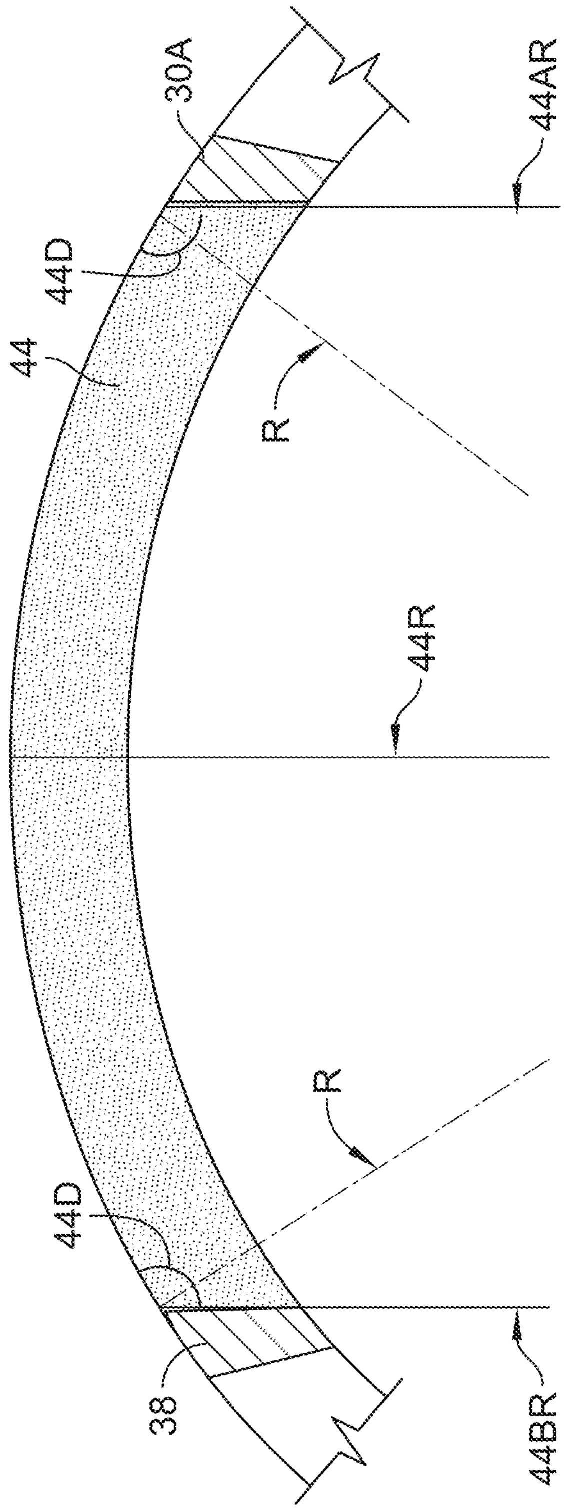
FIG. 8B is a conceptual view of a portion of the fan track liner of FIG. 8A, showing the side walls of the grooves and the circumferential ends of the movable segments are parallel to a central radially extending line of the groove and segment.

This is concept is shown conceptually in FIG. 8B, which shows an exaggerated view of how the first and second ends 44A, 44B of the segment 44 being parallel with the radial line 44R allows for radial translation of the segment 44. As can be seen in FIG. 8B, which shows imaginary lines 44AR, 44BR extending parallel to the ends 44A, 44B and the radius R at various random locations of the circle defined by the case 25, this angle 44D is required to allow the segment 44 to translate radially. If this angle 44D were not present and the first and second ends 44A, 44B as well as the inner walls 30C, 30D of the circumferential side walls 30A, 30B and inner walls 38B, 38C of the central wall 38 were formed parallel to the radial direction at those locations, the segment 44 would be locked in place within the groove 36.

The orientation of the first and second ends 44A, 44B, the inner walls 30C, 30D of the circumferential side walls 30A, 30B and inner walls 38B, 38C of the central wall 38 also allows the movable segments 44 to translate radially within the grooves 36 without any type of gap being created between the first and second ends 44A, 44B and the inner walls 30C, 30D of the circumferential side walls 30A, 30B and the inner walls 38B, 38C of the central wall 38. In some embodiments, a very slight additional taper angle 44D may be formed between these walls 30C, 30D, 38B, 38C and the ends 44A, 44B of the segments 44 in order to avoid binding. In some embodiments, one or more small seals may be provided between the first and second ends 44A, 44B and the inner walls 30C, 30D of the circumferential side walls 30A, 30B and/or the inner walls 38B, 38C of the central wall 38 in order to seal any gaps formed therebetween.

Illustratively, the movable segments 44 each include a radially inwardly facing surface 44C formed as a slightly curved planar surface (when viewed in the axial direction), as can be seen in FIG. 8A. The stationary segments 34A each include a similar radially inwardly facing surface 34B that is a slightly curved planar surface (when viewed in the axial direction) so as to generally match the curvature of the case 25. In some embodiments, the curvature of radially inwardly facing surfaces 34B of the stationary segments 34A is the same as the curvature of the radially inwardly facing surfaces 44C of the movable segments 44. Moreover, the radially inwardly facing surfaces 34B, 44C of the segments 34A, 44 each extend axially relative to the axis 11 at the same angle (e.g., as shown in FIG. 9D in which all of the movable segments 44 are fully lowered, a generally flat surface is created by the movable segments 44 and the stationary segments 34A across which air may flow). In this way, when the movable segments 44 are fully lowered in the grooves 36 (i.e. fully radially inward), the radially inwardly facing surfaces 34B of the stationary segments 34A are flush with the radially inwardly facing surfaces 44C of the movable segments 44.

In some embodiments, as can be seen in FIG. 8A, the radially inwardly facing surfaces 30E, 30F, 38A of the circumferential side walls 30A, 30B and the central wall 38 may include the same curvature when viewed in the axial direction and the same axially extending angle of the surface relative to the axis 11 as the radially inwardly facing surfaces 34B, 44C of the segments 34A, 44. As a result, the entirety of the surface across which air flows over during operation of the engine 10, which includes the radially inwardly facing surfaces 30E, 30F, 34B, 38A, 44C described above, is one smooth surface when the movable segments 44 are in their fully lowered positions. Thus, the flow path 15 is only affected in the areas of the grooves 36 when the movable segments 44 are raised therein.

As shown in FIG. 2 and in greater detail in FIGS. 9A-9D, in some embodiments, the variable wall assembly 32 can include an axially extending portion 50 in which the radially inwardly facing surfaces 34B, 44C of the segments 34A, 44 in this portion 50 are parallel with the axis 11, and can also include an angled portion 52 directly axially aft of the axially extending portion 50 in which the radially inwardly facing surfaces 34B, 44C of the segments 34A, 44 in this portion 50 are angled inwardly relative to the axis 11, thus creating a slope in the flow path 15. This slope can accommodate the radial positions of the forward flange 25B and the forward fixed liner wall 28, as shown in FIG. 2. In the angled portion 52, similar to as described above, the radially inwardly facing surfaces 34B, 44C of the segments 34A, 44 each extend axially relative to the axis 11 at the same angle (i.e. at the same angle that creates the radially inwardly moving slope shown in FIGS. 2 and 9A-9D).

Figure 10A:
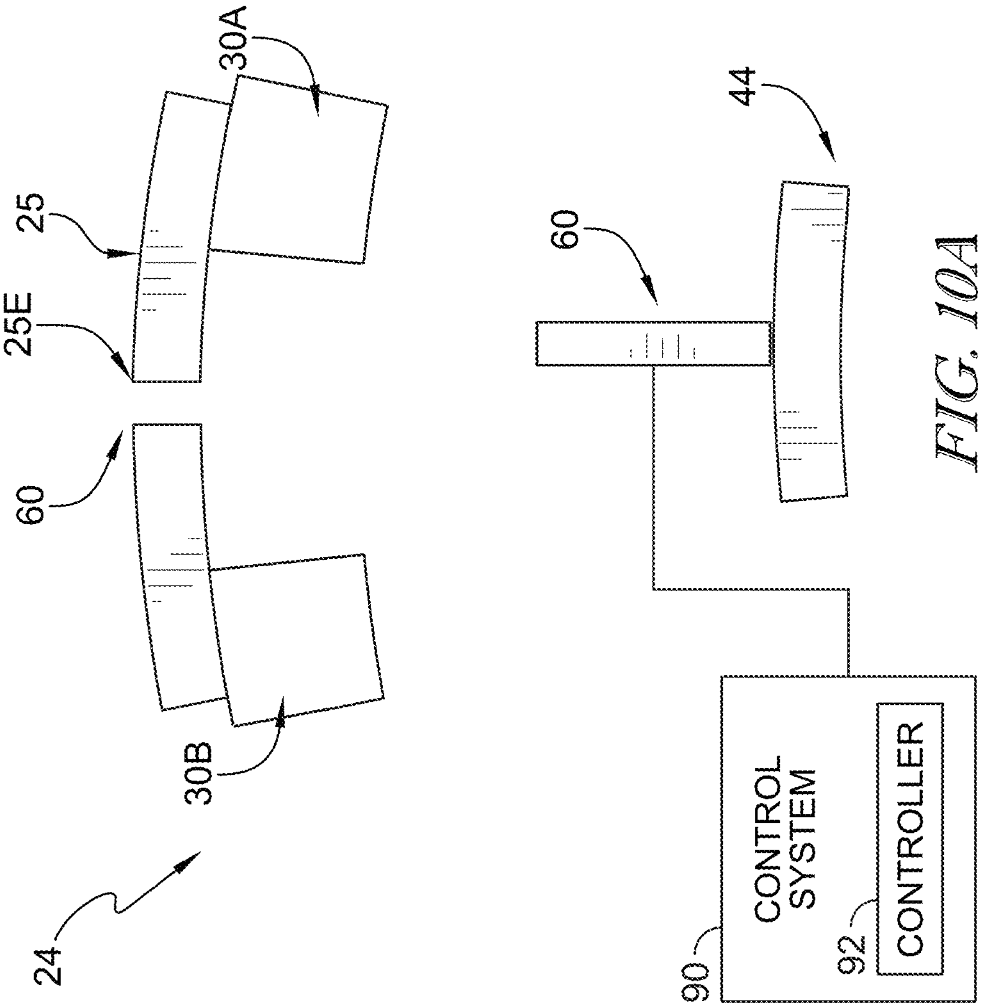
FIG. 10A is an exploded conceptual axially facing view of a movable segment of the fan track liner of FIG. 2, showing that the variable wall assembly can further include an actuator coupled to the movable segment and configured to be actuated so as to translate the segment radially within the groove.
Figure 10C:
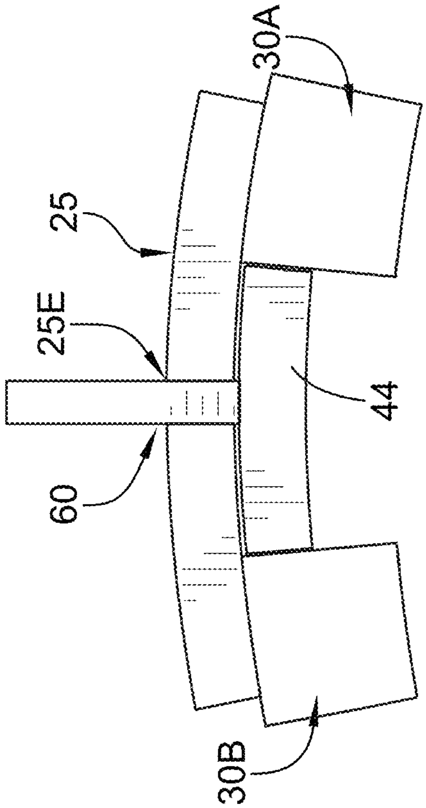
FIG. 10C is a conceptual axially facing view of the movable segment of the fan track liner of FIG. 10B, showing the actuator positioning the movable segment at a second position within the groove that is further into the groove than the position illustrated in FIG. 10B.
Figure 10B:
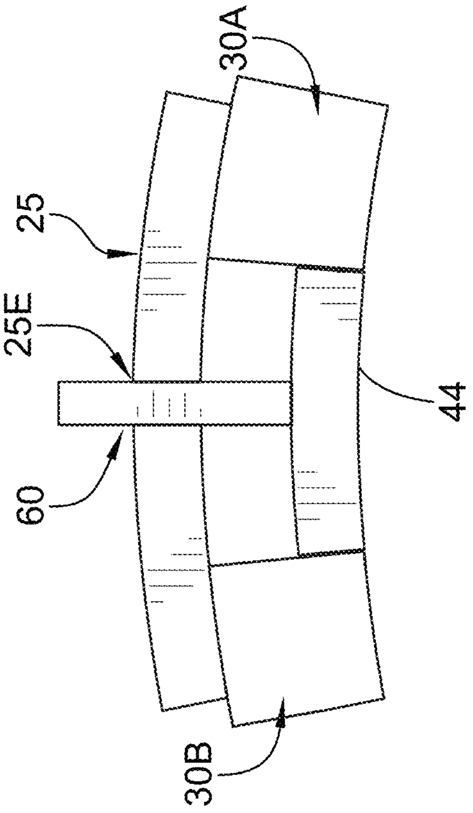
FIG. 10B is a conceptual axially facing view of the movable segment of the fan track liner of FIG. 10A, showing the actuator positioning the movable segment at a first position within the groove that is generally flush with the stationary portion.

In order to translate the movable segments 44 within the grooves 36, the fan case assembly 24 can include actuators 60, as shown in FIGS. 10A-10C. One or more actuators 60 may be coupled to an upper surface of each movable segment 44 and be configured to translate the movable segment 44 radially inwardly and outwardly within the groove 36. The actuators 60 may also be configured to lock at various radial positions so as to lock the movable segments 44 at various positions within the grooves 36. In some embodiments, the actuators 60 may extend through an opening 25E formed in the annular case 25. The actuators 60 may be any known actuator in the art, such as, for example, pneumatic, electric, hydraulic, and the like.

The actuators 60 can be controlled via any known control system 90 so as to translate the movable segments 44 in the radial direction 94 so as to control the positions of the various movable segments 44 in the grooves 36. As shown in FIG. 10A, the control system 90 can include, for example, a controller 92 that is electronically and operably connected to the actuators 60 in order to control movement of the movable segments 44. The controller 92 may include at least one processor connected to a computer readable memory and/or other data storage. Computer executable instructions and data used by a processor may be stored in the computer readable memory included in an onboard computing device, a remote server, a combination of both, or implemented with any combination of read only memory modules or random-access memory modules, optionally including both volatile and nonvolatile memory.

In operation, the actuators 60 can be selectively actuated so as to selectively translate the movable segments 44 within the grooves 36 so as to alter the portion of the flow path 15 across the variable wall assembly 32 of the fan track liner 26 in order to control stall margin of the gas turbine engine 10 and optimize performance of the gas turbine engine 10. Although all figures show possible exemplary positions of the movable segments 44 within the grooves 36, FIGS. 9A-9D are magnified cross-sectional views of the variable wall assembly 32 that clearly show some non-limiting examples of positions of the movable segments 44 within the grooves.

For example, FIGS. 9A-9D shows that the forwardmost groove 36 can be formed axially wide enough so as to receive two movable segments 44 therein. An integrally formed segment 34A' that has an axial extent equivalent to three individual segments 34A is axially aft of the forwardmost groove 36, axially followed by a single movable segment 44 in a groove 36. This single movable segment 44 is axially followed by an integrally formed segment 34A' that has an axial extent equivalent to five individual segments 34A, axially followed by a single movable segment 44 in a groove 36, axially followed by an integrally formed segment 34A' that has an axial extent equivalent to two individual segments 34A, axially followed by a single movable segment 44 in a groove 36, axially followed by an integrally formed segment 34A' that has an axial extent equivalent to three individual segments 34A. It is noted that any of the integrally formed segments 34A' may be formed in individual groups, as described above.

Figure 9A:
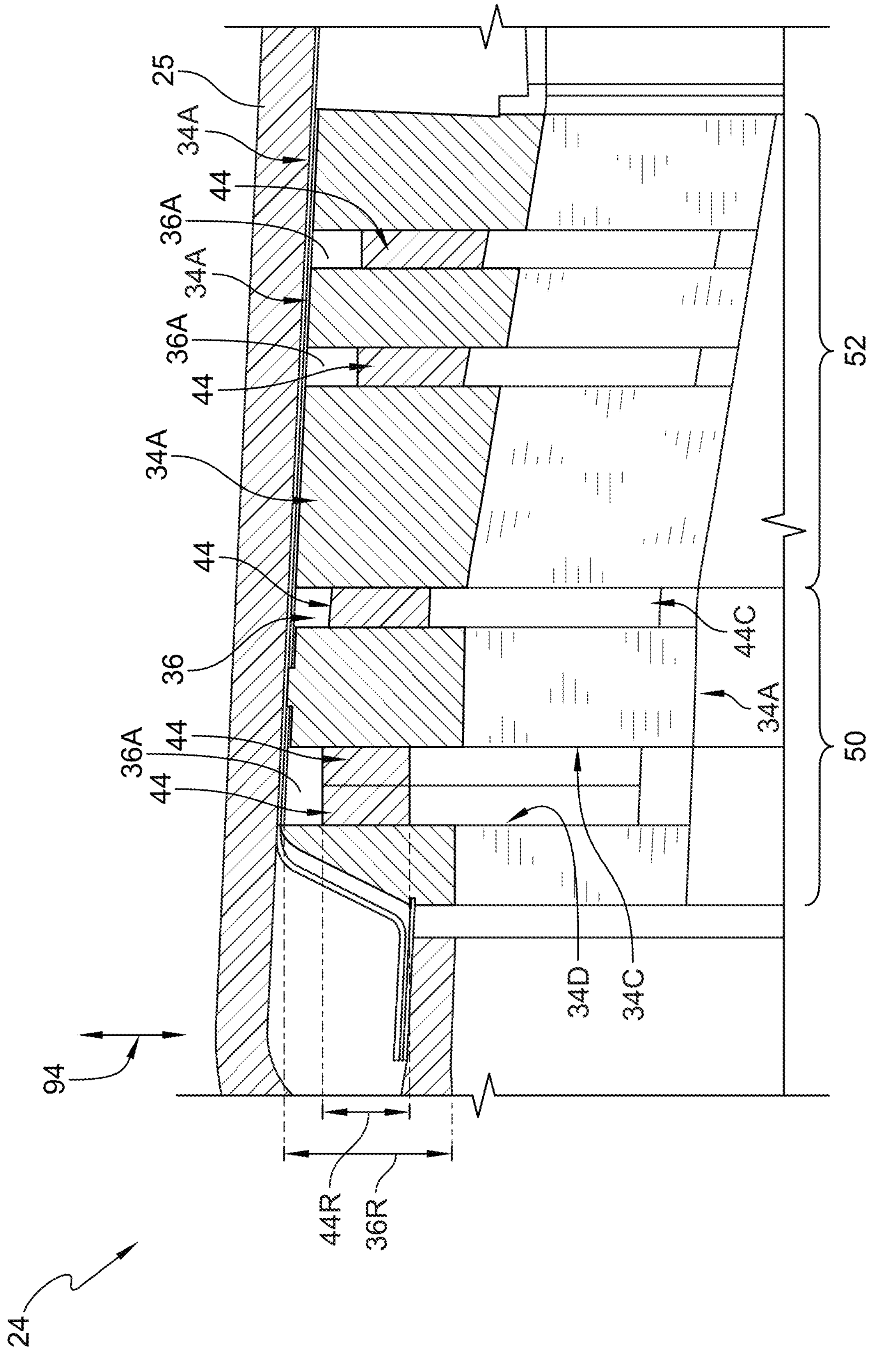
FIG. 9A is a magnified side cross-sectional view of the fan case assembly of FIG. 2, showing various possible positions of the movable segments in the grooves, and showing that the stationary portion formed with integrally formed segments.
Figure 9B:
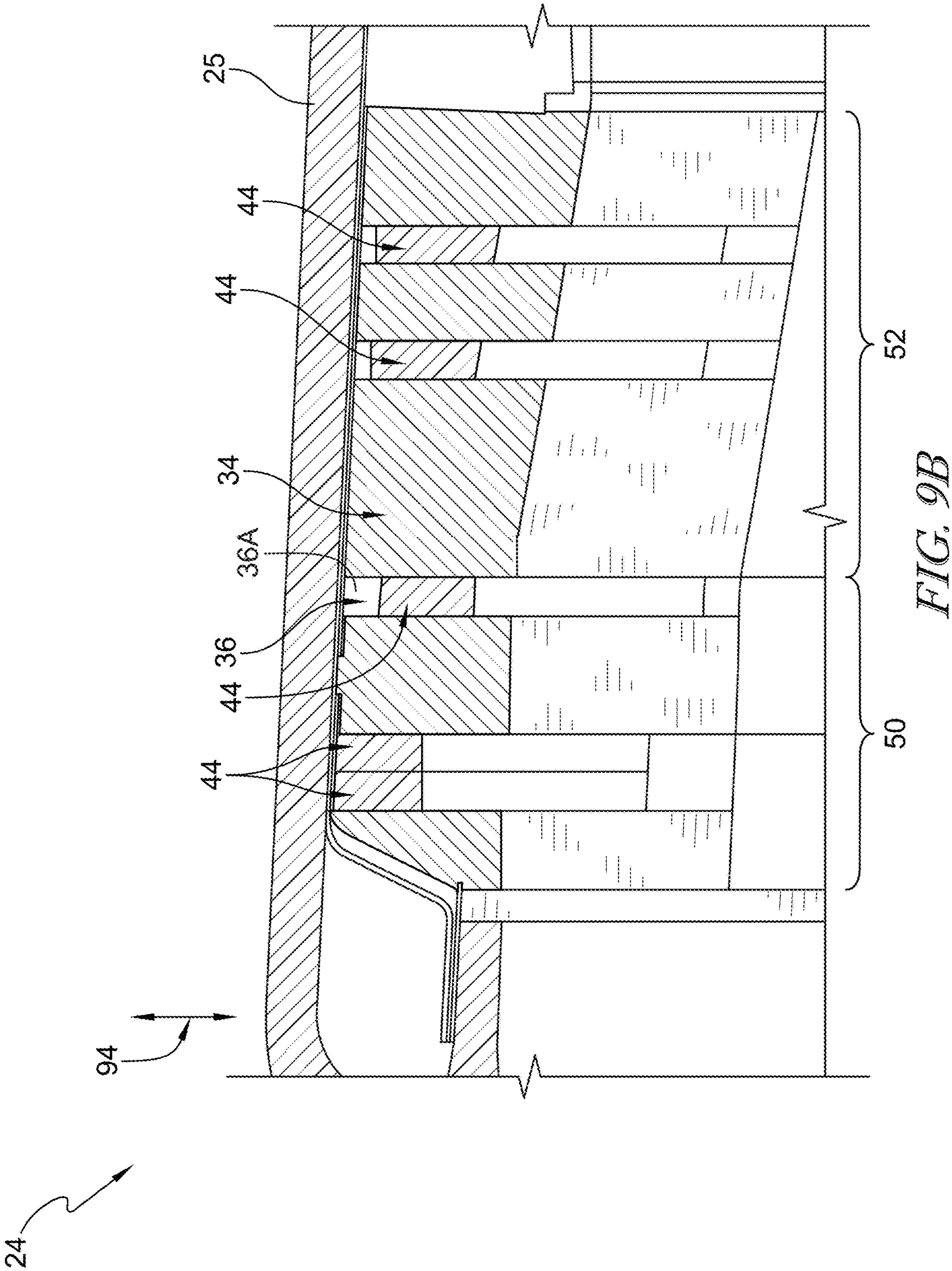
FIG. 9B is a magnified side cross-sectional view of the fan case assembly of FIG. 2, showing other various possible positions of the movable segments in the grooves as compared to FIG. 9A.
Figure 9C:
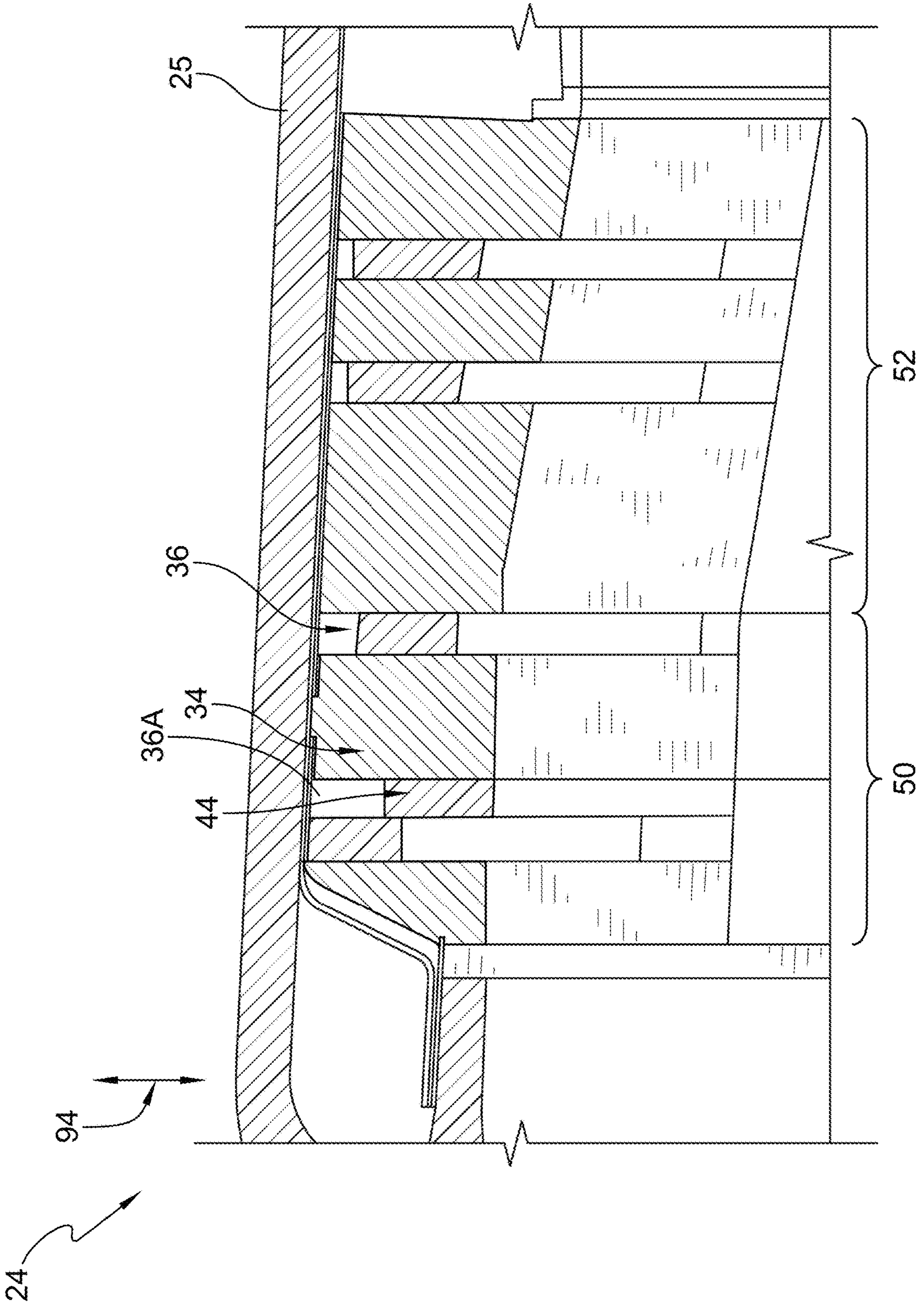
FIG. 9C is a magnified side cross-sectional view of the fan case assembly of FIG. 2, showing other various possible positions of the movable segments in the grooves as compared to FIGS. 9A and 9B, in particular that the two movable segments within the single groove can be moved to different radial positions.
Figure 9D:
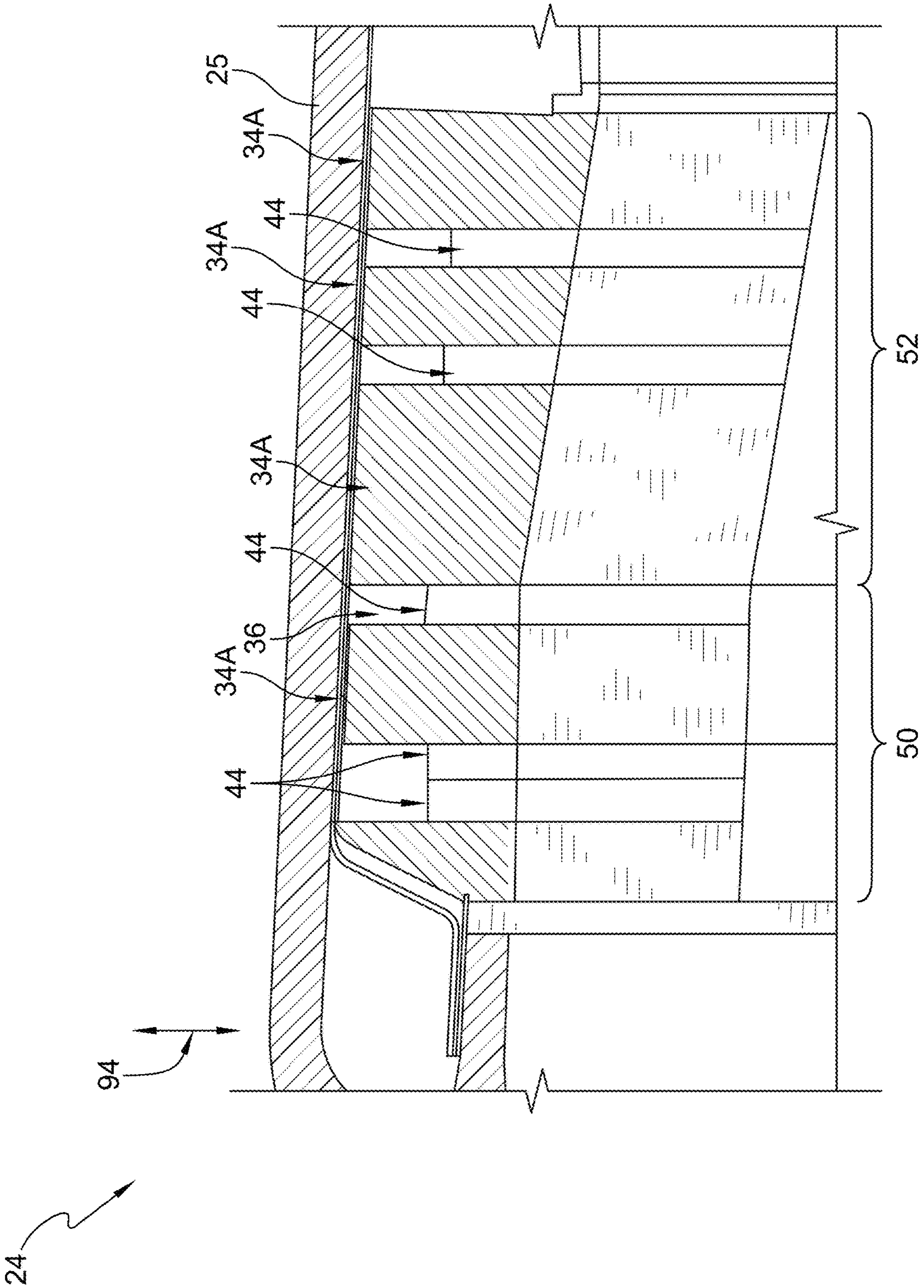
FIG. 9D is a magnified side cross-sectional view of the fan case assembly of FIG. 2, showing other various possible positions of the movable segments in the grooves as compared to FIGS. 9A and 9B, in particular that all segments are fully lowered and flush with the stationary segments.

In FIG. 9A, the movable segments 44 are in raised positions that are approximately halfway radially outwardly within their respective grooves 36. In FIG. 9B, the forwardmost movable segments 44 in the forwardmost groove 36 are in a fully raised position (fully radially outward) and the two aftmost movable segments 44 are slightly more radially outwardly raised than in the positions illustrated in FIG. 9A. FIG. 9C differs from FIG. 9B in that, within the forwardmost groove 36, the forward movable segment 44 is in a fully raised position while the aft movable segment 44 is in the fully lowered position. Finally, FIG. 9D shows all movable segments 44 in the fully lowered position such that all movable segments 44 and stationary portion 34 form a flush surface across which the air may flow.

A person skilled in the art will understand that particular benefits of the embodiments described herein may be found in testing fan track liners. Specifically, different positions of the movable segments 44 within the grooves 36 can be tested in different engine operating conditions and inlet distortion scenarios. As a result, optimal positions of the movable segments 44 within the grooves 36 for certain missions and certain distortion scenarios, in particular those that necessitate specific stall margins, can be determined based on this testing. As stall margin risk increases with higher distortion, the segments 44 may be actuated to increase stall margin as needed. Variable setting of tip treatment depth, width, and location via the segments 44 maintains stall margin, while resetting to standard stall margin when treatment is not required (returns back to optimal efficiency).

A method according to the present disclosure includes providing an annular case 25 that extends circumferentially around an axis 11 of a gas turbine engine 10 and arranging a fan track liner 26 radially inwardly of the annular case 25 and extending circumferentially at least partway about the axis 11 and coupling the fan track liner 26 to the annular case 25. The fan track liner 26 includes a variable wall assembly 32 having a stationary portion 34 defining at least one groove 36 therein that extends circumferentially at least partway about the axis 11 and at least one movable segment 44 arranged in the at least one groove 36. The at least one movable segment 44 has a first radial extent 44R that is less than a second radial extent 36R of the at least one groove 36 so as to allow the at least one movable segment 44 to be selectively radially translatable within the at least one groove 36. A first radially inwardly facing surface 44C of the at least one movable segment 44 and a second radially inwardly facing surface 34B of the stationary portion 34 define a portion of a flow path 15 across the fan track liner 26.

The method can further include radially translating the at least one movable segment 44 within the at least one groove 36 so as to alter the portion of the flow path 15 across the fan track liner 26 in order to control stall margin of the gas turbine engine 10 and optimize performance of the gas turbine engine 10.

The present disclosure provides numerous advantages in controlling stall margin and optimizing engine 10 performance. When dealing with inlet distortion from an embedded application, there is a steep trade between stall margin and performance and there may be points during a mission or moments with maneuvers that find it desirable to incorporate a different stall margin available. Attempting to solve the worst stall condition while maintaining performance over the cycle or many flight conditions may be difficult and result in compromised efficiency or a limited flight envelope.

The radially translatable segments 44 described herein improve control over stall margin and aid in optimizing engine 10 performance. The segments 44 may be flush to flow path 15 when additional stall margin is not required and then move under-flush to a desired depth (radial depth) when stall margin is desired. There could be multiple axial stations that enable variable axial width by increasing the number of grooves activated and may independently control different tangential locations.

The present disclosure permits optimal tip clearance and positive efficiency and minimized specific fuel consumption when in normal cruise operation but then also provide stall margin benefit when desired. The embodiments described herein permit the engine 10 to be designed with multiple configurations which allow it to be optimized to different conditions with one assembly. This is beneficial to eliminating a troublesome trade between stall margin and performance potentially, or the system would be able to handle more extreme inlet distortion during maneuvering.

The present disclosure can be adapted for bolted composite liners, bonded composite liners, or in a solid case—although bolted or bonded composite liners may be optimal for weight. The system could be ganged as suitable to operate multiple tangentially located segments at one as well as axial rows.

It is noted that any reference numerals utilizing the prime symbol (') and not explicitly mentioned in the specification refer to the original component represented by that reference numeral, unless otherwise indicated.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising an annular case that extends circumferentially around an axis of the gas turbine engine, and a fan track liner arranged radially inwardly of and coupled to the annular case and extending circumferentially at least partway about the axis, the fan track liner including a variable wall assembly having a stationary portion defining at least one groove therein that extends circumferentially at least partway about the axis and at least one movable segment arranged in the at least one groove, wherein the at least one movable segment has a first radial extent that is less than a second radial extent of the at least one groove so as to allow the at least one movable segment to be selectively radially translatable within the at least one groove, wherein a first radially inwardly facing surface of the at least one movable segment and a second radially inwardly facing surface of the stationary portion define a portion of a flow path across the fan track liner, and wherein the at least one movable segment is configured to be radially translated within the at least one groove so as to alter the portion of the flow path across the fan track liner in order to control stall margin of the gas turbine engine and optimize performance of the gas turbine engine, wherein the variable wall assembly further includes a central wall that extends axially through the at least one groove so as to divide the at least one groove into a first groove and a second groove such that the first groove is circumferentially spaced apart from the second groove by the central wall, wherein the first groove and the second groove each include a bottom surface of the respective groove, and wherein the central wall has a third radially inwardly facing surface that is closer to the axis than the bottom surface of the first and second grooves such that the first groove is separate from the second groove, and wherein the at least one movable segment includes a first movable segment arranged in the first groove and a second movable segment arranged in the second groove.

2. The fan case assembly of claim 1, wherein the at least one movable segment is configured to be selectively translated to a first position in which the first radially inwardly facing surface is located at a first radial distance from the axis, wherein the second radially inwardly facing surface of the stationary portion is located at a second radial distance from the axis, and wherein the at least one movable segment is configured to be selectively translated such that the first radial distance is equal to the second radial distance such that the first radially inwardly facing surface is flush with the second radially inwardly facing surface so as to provide a first stall margin.

3. The fan case assembly of claim 2, wherein the at least one movable segment is configured to be selectively translated such that the first radial distance is greater than the second radial distance such that the first radially inwardly facing surface is located radially outward of the second radially inwardly facing surface so as to provide a second stall margin different than the first stall margin.

4. The fan case assembly of claim 3, wherein the stationary portion is comprised of a plurality of stationary segments, wherein a first stationary segment and a second stationary segment of the plurality of stationary segments are axially spaced apart from each other so as to define the first groove of the at least one groove therebetween.

5. The fan case assembly of claim 4, wherein the plurality of stationary segments includes a third stationary segment that is arranged axially adjacent to and contacting the second stationary segment, and wherein a first axial distance between a forward facing surface of the second stationary segment that faces the first groove and an aft facing surface of the third stationary segment is greater than a second axial distance between an aft facing surface of the first stationary segment that faces the first groove and the forward facing surface of the second stationary segment.

6. The fan case assembly of claim 4, wherein the first movable segment and a third movable segment of the at least one movable segment are arranged within the first groove, and wherein the first movable segment and the third movable segment are each independently translatable within the first groove.

7. The fan case assembly of claim 1, wherein a first circumferential extent of the first groove is equal to a second circumferential extent of the second groove.

8. The fan case assembly of claim 1, wherein a first circumferential extent of the first groove is different than a second circumferential extent of the second groove.

9. The fan case assembly of claim 1, wherein the fan track liner includes a plurality of liner segments that are arranged around the annular case and that each include a respective variable wall assembly.

10. The fan case assembly of claim 1, wherein the at least one groove includes a third groove defined by the stationary portion, and wherein the first groove is axially spaced apart from the third groove.

11. The fan case assembly of claim 10, wherein the at least one movable segment further includes and a third movable segment arranged in the third groove, and wherein the first movable segment and the third movable segment are each independently translatable such that the first and third movable segments are configured to be arranged at the same or different radially positions within the first and third grooves, respectively.

12. A fan case assembly adapted for use with a gas turbine engine, the fan case assembly comprising an annular case that extends circumferentially around an axis of the gas turbine engine, and a fan track liner coupled to the annular case and including a variable wall assembly having a stationary portion defining at least one groove therein and at least one movable segment arranged in the at least one groove, wherein the at least one movable segment is selectively radially translatable within the at least one groove, and wherein radial translation of the at least one movable segment within the at least one groove is configured to alter a flow path across the fan track liner in order to control stall margin of the gas turbine engine and optimize performance of the gas turbine engine, and wherein the at least one groove includes a first groove and a second groove defined by the stationary portion, wherein the first groove is axially spaced apart from the second groove, wherein the at least one movable segment includes a first movable segment arranged in the first groove and a second movable segment arranged in the second groove, and wherein the first movable segment and the second movable segment are each independently translatable such that the first and second movable segments are configured to be arranged at the same or different radially positions within the first and second grooves, respectively.

13. The fan case assembly of claim 12, wherein the stationary portion is comprised of a plurality of stationary segments, and wherein a first stationary segment and a second stationary segment of the plurality of stationary segments are axially spaced apart from each other so as to define the first groove.

14. The fan case assembly of claim 13, wherein the at least one movable segment further includes a third movable segment, wherein the first movable segment and the third movable segment are arranged within the first groove, and wherein the first movable segment and the third movable segment are each independently translatable within the first groove.

15. The fan case assembly of claim 12, wherein the variable wall assembly further includes a central wall that extends axially through at least one of the first groove and the second groove so as to divide the at least one of the first groove and the second groove into at least one of a third groove and the first groove or a fourth groove and the second groove such that at least one of the first and third grooves are circumferentially spaced apart from each other by the central wall or the second and fourth grooves are circumferentially spaced apart from each other by the central wall, wherein at least one of the first and third grooves or the second and fourth grooves each include a bottom surface of the respective groove, wherein the central wall has a third radially inwardly facing surface that is closer to the axis than the bottom surface of the respective groove such that at least one of the first groove is separate from the third groove or the second groove is separate from the fourth groove, and wherein the at least one movable segment includes at least one of a third movable segment arranged in the third groove or a fourth movable segment arranged in the fourth groove.

16. The fan case assembly of claim 12, further comprising:

at least one actuator configured to translate the at least one movable segment radially.

17. A method comprising providing an annular case that extends circumferentially around an axis of a gas turbine engine, arranging a fan track liner radially inwardly of the annular case and extending circumferentially at least partway about the axis and coupling the fan track liner to the annular case, the fan track liner including a variable wall assembly having a stationary portion defining a first groove and a second groove therein that each extend circumferentially at least partway about the axis, the first and second grooves being axially spaced apart from each other, the variable wall assembly further having a first movable segment arranged in the first groove and a second movable segment arranged in the second groove, wherein the first and second movable segments each have a first radial extent that is less than a second radial extent of the first and second grooves so as to allow the first and second movable segments to be selectively radially translatable within the first and second grooves, wherein radially inwardly facing surfaces of the first and second movable segments and a radially inwardly facing surface of the stationary portion define a portion of a flow path across the fan track liner, and radially translating at least one of the first and second movable segments within the respective first and second grooves so as to alter the portion of the flow path across the fan track liner in order to control stall margin of the gas turbine engine and optimize performance of the gas turbine engine.

* * * * *